United States Patent [19]

Eriksson

[11] 4,194,542
[45] Mar. 25, 1980

[54] DEVICE IN AN APPARATUS FOR PROCESSING TREES

[76] Inventor: Jan. A. L. Eriksson, Pl. 345, 810 20 Österfärnebo, Sweden

[21] Appl. No.: 887,350

[22] Filed: Mar. 16, 1978

[30] Foreign Application Priority Data

Mar. 18, 1977 [SE] Sweden .............................. 7703102
Sep. 1, 1977 [SE] Sweden .............................. 7802680

[51] Int. Cl.² .......................... A01G 23/08; B27L 1/00
[52] U.S. Cl. ................................. 144/2 Z; 144/208 E; 144/309 AC
[58] Field of Search ................ 144/2 Z, 3 D, 34 R, 144/34 E, 309 AC, 208 E

[56] References Cited

U.S. PATENT DOCUMENTS

| | | | |
|---|---|---|---|
| 3,596,690 | 8/1971 | Hamilton | 144/3 D X |
| 3,690,351 | 9/1972 | Strickland et al. | 144/2 Z |
| 3,735,786 | 5/1973 | Vit | 144/2 Z |
| 3,797,539 | 3/1974 | Moser et al. | 144/2 Z X |
| 3,974,866 | 8/1976 | Sarenketo | 144/3 D |
| 3,981,336 | 9/1976 | Levesque | 144/2 Z |
| 4,083,463 | 4/1978 | Ericsson | 144/34 R |

*Primary Examiner*—John Sipos
*Assistant Examiner*—W. D. Bray
*Attorney, Agent, or Firm*—Diller, Ramik & Wight

[57] ABSTRACT

This invention is related to a delimbing device for processing trees comprising a grabbing device including at least two grabbing arms being movable towards and away from each other in order to grab a tree, one or more limbing members to limb the tree, at least two rolls to feed the tree through the apparatus and a severing device to sever the tree, said rolls being arranged on said grabbing arms in order to follow the grabbing arms in their movements towards and away from a tree movement path through the apparatus, said apparatus being connected to a crane arm through a rotational connection allowing pivotal movement of the apparatus relative to the crane arm in an essentially vertical plane, wherein the apparatus in addition is connected to the crane arm through a second rotational connection having an essentially vertical axis, about which the apparatus is rotatable in a suspended state by means of a drive means with said grabbing arms depending downwardly from said second rotational connection.

19 Claims, 5 Drawing Figures

DEVICE IN AN APPARATUS FOR PROCESSING TREES

This invention is related to a device in an apparatus for processing trees comprising a grabbing device including at least two grabbing arms being movable towards and away from each other in order to grab a tree, one or more limbing members to limb the tree, at least two rolls to feed the tree through the apparatus and a severing device to sever the tree, said rolls being arranged on said grabbing arms in order to follow the grabbing arms in their movements towards and away from a tree movement path through the apparatus, said apparatus being connected to a crane arm through a rotational connection allowing pivotal movement of the apparatus relative to the crane arm in an essentially vertical plane.

Apparatuses of a similar kind are e.g. known by the U.S. Pat. No. 3,974,866, the Swedish patent publications 7012638-8, 342 123, 7317138-1 and the Norwegian patent publication 135 393. A disadvantage common to said apparatuses is that their range of application is limited. Thus, said apparatuses are exclusively intended to grab a standing tree and subsequently limb and sever the tree in suitable lengths. More specifically, the apparatuses according to the U.S. Pat. No. 3,974,866 and the Swedish publication No. 7317138-1 are intended to limb and sever the tree to logs while the tree is held in an upright position. The apparatuses according to the other publications are adapted to grab a standing tree, sever the same and pivot the same into a horizontal position, whereafter limbing is conducted while the tree is fed through the apparatuses. These known apparatuses are pivotably connected to suitable crane arms through rotational connections having horizontal axes. Apart from the fact that the known apparatuses are limited to a certain mode of operation, they suffer from the disadvantage that they often require highly specialized vehicles which often are not useful for other purposes than handling said apparatuses.

The object of the invention is to remove the indicated disadvantages and achieve an apparatus which on one hand is as simple and uncomplicated as possible and on the other has a considerably widened range of application.

This object is achieved primarily in that the apparatus in addition to the crane arm through a second rotational connection having an essentially vertical axis, about which the apparatus is rotatable in a suspended state by means of a drive means with said grabbing arms depending downwardly from said second rotational connection. By the capability of rotation about a vertical axis with the grabbing arm extending downwardly, the apparatus may easily grab trees lying on the ground and move the trees into engagement with the rolls. Also in extremely difficult positions, a tree may be grabbed and in addition, the same may be fed through the apparatus while the tree is moved from a position remote from the vehicle to a position adjacent the vehicle so that when the tree has been moved to the desired position adjacent the vehicle (or a forest road) such a length of the tree has been fed through the apparatus and limbed that said length may immediately be severed. Thus, a maximum efficiency in operation is obtained. It is sometimes difficult or impossible to reach and fell a tree by means of an apparatus carried on a vehicle and in such cases the known apparatuses cannot be used. The apparatus according to the invention may, however, be used for processing such trees though they must be felled in another way, e.g. by means of a hand-carried power saw.

According to a preferred embodiment, the rolls are pivotable relative to the grabbing arms about shafts extending essentially perpendicularly to the axes of rotation of said rolls which in turn extend essentially parallel to the plane of movement of the grabbing arms. In this way, the rolls may automatically adjust themselves into the proper positions for guiding and feeding a tree through the apparatus and a minimum number of rolls may be used, i.e. two rolls.

Referring to the appended drawings, below follows a specific description of an embodiment according to the invention.

Figure 1:
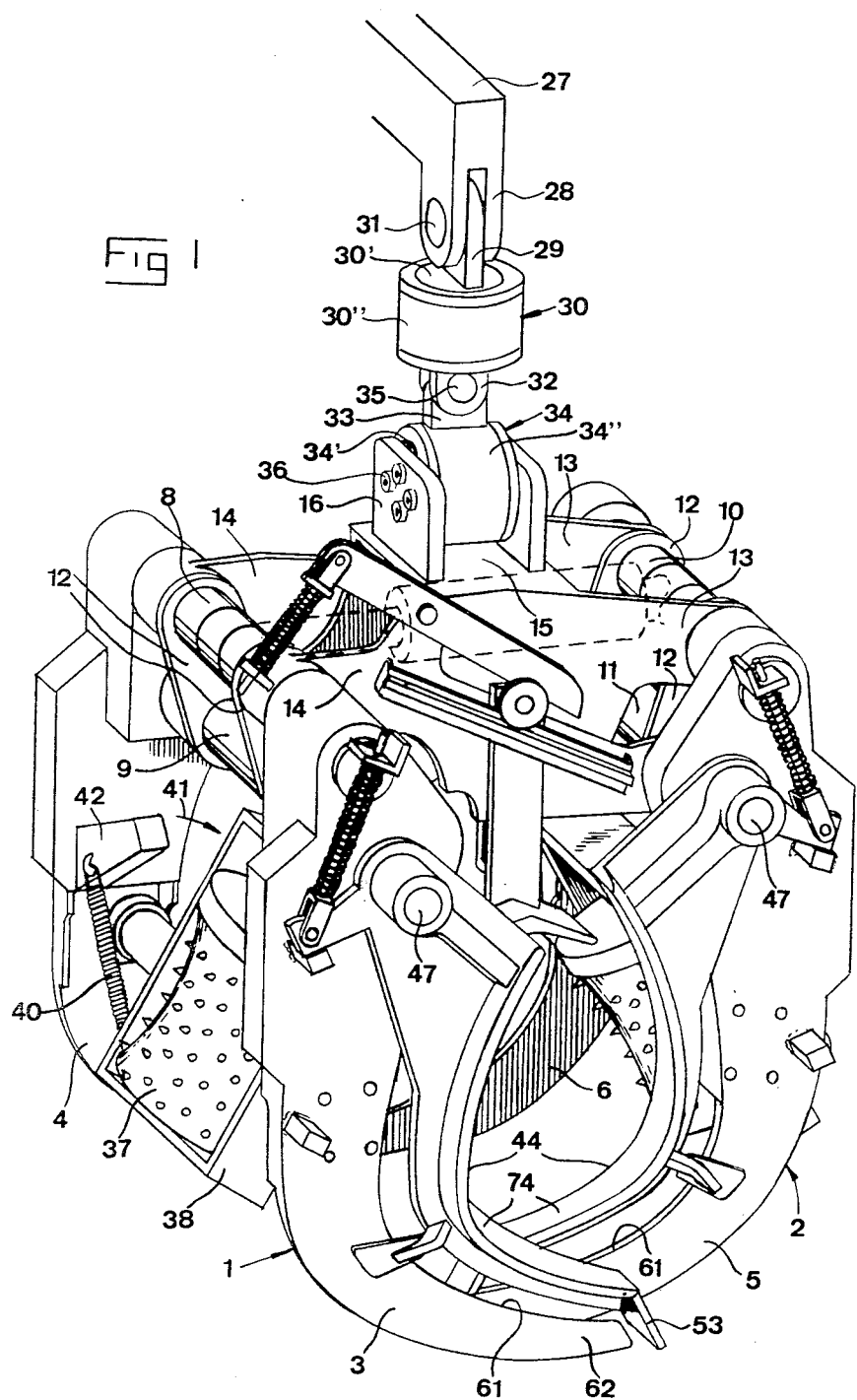
FIG. 1 is a perspective view of the apparatus according to the invention.

The apparatus comprises a grabbing device having two grabbing arms 1, 2 which are movable towards and away from each other in order to grab a tree. The grabbing arms 1, 2 comprise two arm parts 3, 4 and 5, 6 respectively. The arm parts 3, 4 are interconnected by two shafts 8, 9 and the arm parts 5, 6 are interconnected by shafts 10, 11. The shaft pins 47 may constitute axial extensions of shafts 9, 11. Links 12 extend between shafts 8, 9 and between shafts 10, 11. Two first link parts 13 extend between shafts 9 and 10 and are rotatably connected to said shafts. Two second link parts 14 extend between shafts 8 and 11 and are rotatably connected to said shafts. The link parts 13, 14 may be provided with sleeves engaging the shafts 9, 10 and 8, 11 respectively.

The link parts 13 are interconnected by a cross piece 15 presenting two lugs 16. The link parts 13, cross piece 15 and lugs 16 form in unison a base or support member which is connected to a crane arm 27 as will be described hereinafter. A piston-cylinder mechanism 17 (FIGS. 1 and 5) extends between shafts 8 and 10 and is provided with sleeves at the ends thereof, said sleeves engaging portions of shafts 8, 10 in a rotatable manner. Grabbing arms 1 and 2 may be pivoted towards and away from each other by operating the double-acting piston-cylinder mechanism 17 and then, grabbing arm 1 will mainly pivot about shaft 9 while grabbing arm 2 will pivot about shaft 10.

Figure 3:
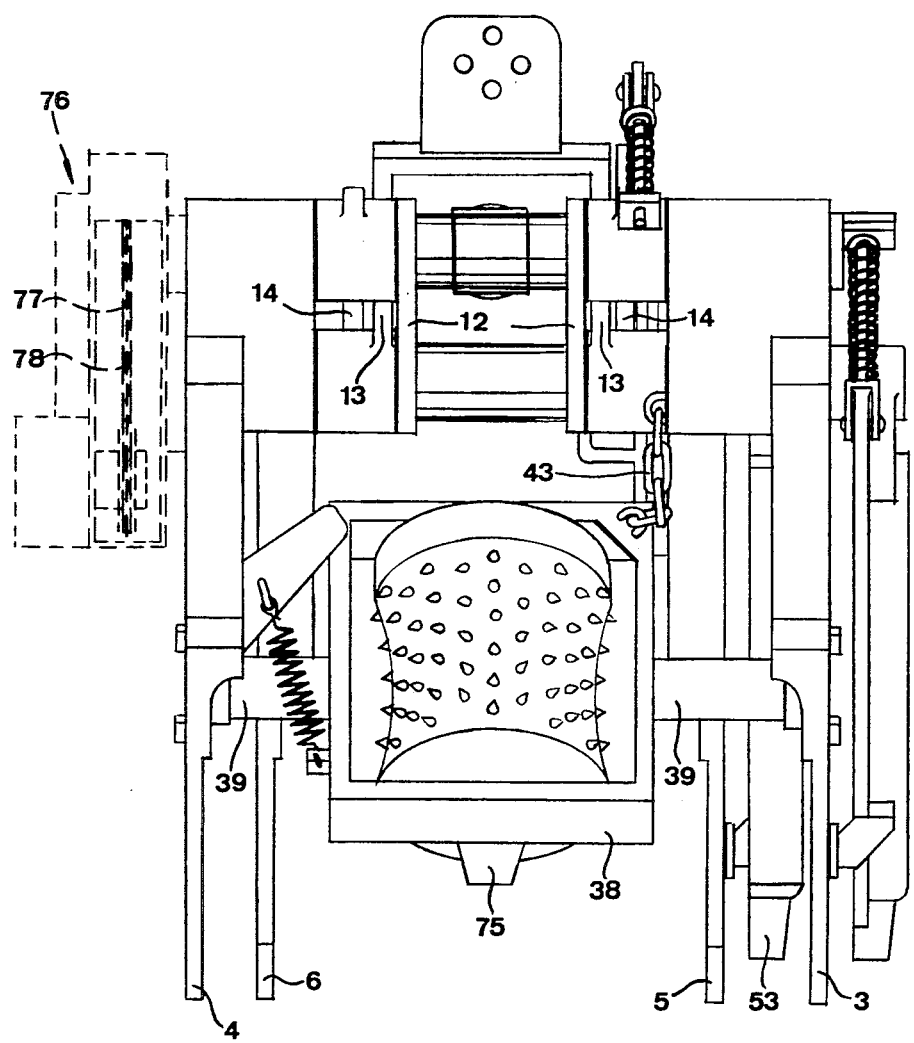
FIG. 3 is a side view of the apparatus as viewed from the left in FIG. 2.

As appears from FIG. 3, arm parts 5, 6 are arranged between arm parts 3, 4. The links 12 are arranged between link parts 13 which in turn are arranged between link parts 14.

Figure 2:
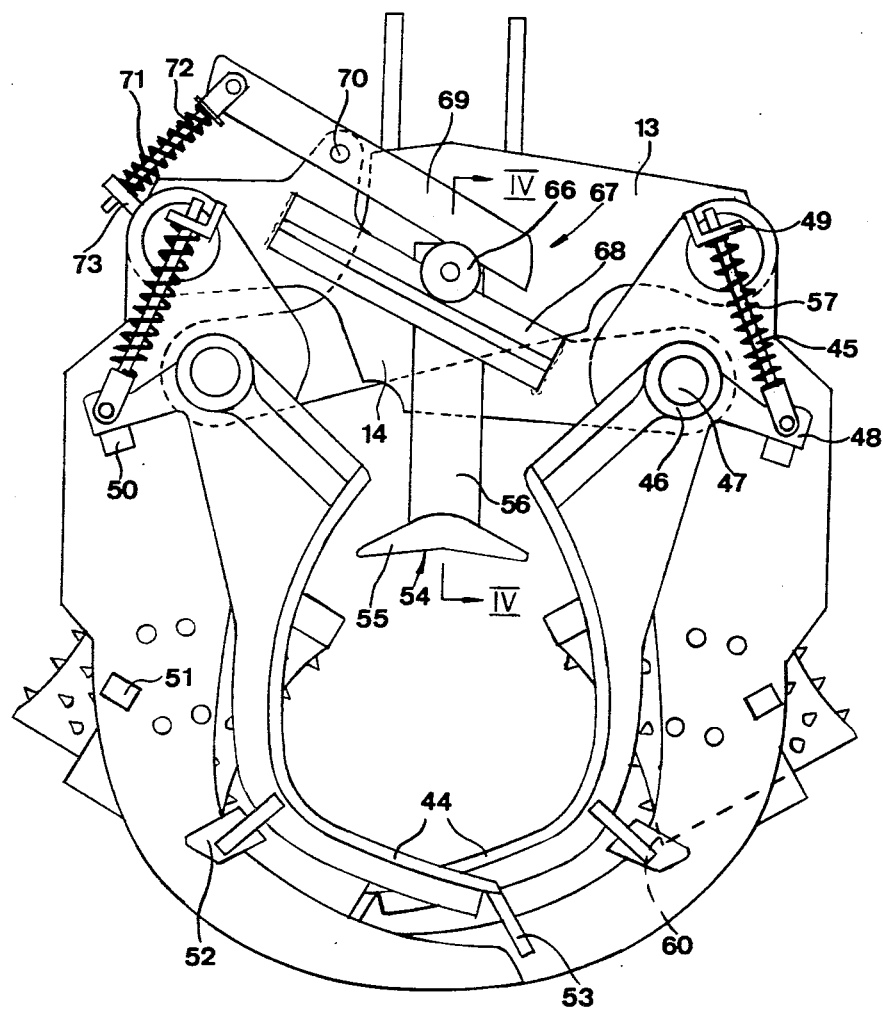
FIG. 2 is a front view of the apparatus.

As appears from FIGS. 1 and 2, the arm parts 3 to 6 of grabbing arms 1, 2 are curved so as to grab and hold a tree therebetween.

From FIG. 1, it appears that a feed roll 37 is connected to each grabbing arm 1, 2. The rolls 37 are thus adapted to follow the grabbing arms in their pivotal movements affectuated by piston-cylinder mechanism 17.

Figure 5:
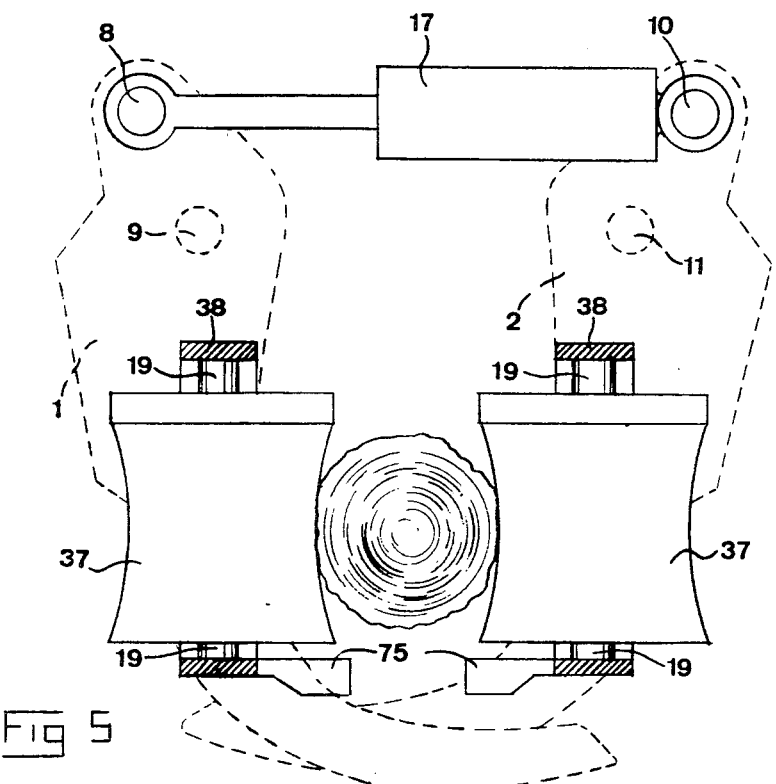
FIG. 5 is a diagrammatical view of the apparatus during operation.

The rolls 37 are located on the grabbing arms 1, 2 so that the rolls always come into engagement with a tree grabbed between the grabbing arms when they are approached towards each other. The rolls are arranged in a diametrically opposed relation and adapted to feed trees through the apparatus in a movement path extending between the grabbing arms 1, 2 and essentially perpendicularly to the plane of movement of the grabbing arms 1, 2. The rolls 37 have a concave envelope surface provided with projections. The concave design of said envelope surface serves to locate the tree trunk in the area in which the rolls have their smallest diameter. Each roll is rotatably supported in a rectangular frame 38 which is constructed of four rectangular beams and connected to a grabbing arm 1 and 2 respectively. More specifically, the frame 38 is located between arm parts 3, 4 and 5, 6 respectively and connected thereto through shaft pins 39 about which the frame is pivotable about an axis perpendicular to the plane of movement of grabbing arms 1, 2. The rolls are rotatably connected to frame 38 by two shaft pins 19 (FIG. 5). The rolls 37 may be of the type including an enclosed hydraulic motor, i.e. a stator included in the motor is rigidly connected to the shaft pins 19 and frame 38 while a rotor is rigidly connected to the envelope portion of the rolls. The rolls 37 are disposed in the spaces or cavities present between the arm portions 3, 4 and 5, 6 of grabbing arms 1, 2.

Springs 40 act on the frames 38 so as to pivot the ends of frames 38 adjacent the free ends 62 of the grabbing arms away from each other as indicated in FIGS. 1 to 3. Arrow 41 indicates the pivotal direction in which spring 40 is urging frame 38 in FIG. 1. The spring 40 acts between frame 38 and a bracket 42 connected to arm part 4. The pivotal movement of frame 38 in the direction of arrow 41 is limited by a stop 43 formed by a short chain attached to frame 38 and arm part 3. Pivotal movement of frame 38 in a direction opposite arrow 41 is limited by bracket 42. By the pivotal arrangement of rolls 37 relative to grabbing arms 1, 2 it is possible for the rolls 37 to pivot in a self-adjusting manner into the most preferable feed positions so that the tree trunk will be centered in the deepest portion of the concave envelope surfaces of the rolls. The strength of spring 40 should be selected so that the rolls 37 cannot pivot too easily in a direction opposite arrow 41.

The rolls 37 are arranged on the grabbing arms at a distance from the ends 62 of the grabbing arms 1, 2. The grabbing arms extend at least between their ends 62 and the rolls 37 at an angle to the axes of rotation of said rolls at least when the rolls are in rest position (FIGS. 1-3). More specifically, the grabbing arms 1, 2 have between their ends 62 and the rolls a concave shape on their inner sides 61 facing the tree movement path through the apparatus. Thus, when the end portions 62 of the grabbing arms have picked up a tree trunk it will be moved along said inner sides 61 into engagement with the rolls 37 when the grabbing arms are moved towards each other. The peripherical inner portions 60 of the rolls located near the ends 62 of the grabbing arms are located flush with or outside the inner sides 61 of the grabbing arms when the rolls 37 are in a rest position (FIGS. 1 to 3). The tree trunk will thus directly engage the envelope surfaces of the rolls when the grabbing arms are moved towards each other instead of hitting end or edge portions of the rolls.

A limbing member 44 is connected to each arm part 3, 5 of grabbing arms 1, 2. The limbing members or knives 44 are pivotably connected to arm parts 3, 5. Each limbing member 44 comprises a sleeve 46 engaging an extension 47 of shafts 9, 11 previously described. Each limbing member 44 is actuated by a spring 57 urging the limbing member to be pivoted in relation to the arm parts 3 and 5 respectively in a direction towards the tree movement path through the apparatus. Spring 57 acts between a projection 48 on the limbing member 44 and a bracket 49 attached to arm part 3 and 5 respectively. The pivotal movement of limbing members 44 in relation to arm parts 3, 5 in a direction towards the tree movement path through the apparatus is limited by stops 50. The spring 57 is arranged about a guide pin 45 which is pivotably connected to projection 48 and protrudes through a hole in bracket 49. The pivotal movement of the limbing members 44 in a direction away from each other is limited by second stops 51 on grabbing arms 1, 2. The springs 57 serve to maintain the limbing members 44 in contact with the tree trunk during the limbing action while simultaneously providing resiliency to the limbing members for irregularities on the tree trunks. The limbing members 44 have support members 52 located remote from shafts 47 in order to abut against the grabbing arms and slide thereon when pivoting the limbing members relative to the grabbing arms. Thus, the shafts 47 are to some extent relieved from the forces occurring during limbing. In order to eliminate the risk of small tree trunks or limbs sticking between the limbing members and grabbing arms, the limbing members have deflected end portions 53 extending to the vicinity of the free ends 62 of the grabbing arms and sidewardly thereof. These end portions 53 bridge the space between the limbing members 44 and arm parts 3, 5.

Figure 4:
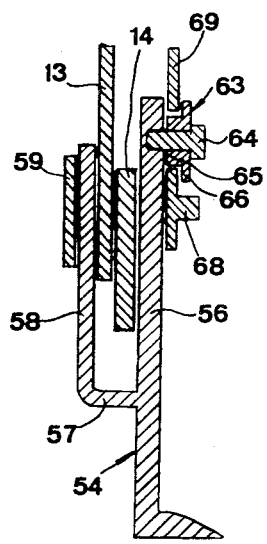
FIG. 4 is a section along line IV—IV in FIG. 2.

An additional limbing member or knife 54 is provided with an edge portion 55 located between limbing members 44. Limbing member 54 comprises a leg 56 having a branch 57 continuing into a portion 58 extending parallel to leg 56. Said portion 58 is received in a U-shaped guide 59 (FIG. 4) which is attached with its flanges to the inner side of one of the link parts 13 while defining a straight channel. Limbing member 54 is movable to and fro in the guide 59 in a specified direction relative to link part 13, namely in a vertical direction upwardly and downwardly as viewed in FIGS. 1-4. The leg 56 is at the end thereof provided with a projection 63 in the form of a pin or screw 64 carrying a part having two annular portions 65, 66 of different diameter. Projection 63 is received in a second guide 67 connected to one of the link parts 14. Said guide 67 is constructed by a rib 68 connected at the ends thereof to link part 14 and a second resilient rib 69. The portion 65 is located between ribs 68, 69 while the ribs are partially enclosed by the leg 56 and the portion 66. The rib 69 is pivotably supported on link part 14 about a shaft 70 and the rib 69 forms a lever having one arm part engaging the projection 63 and one arm part connected to a spring 71 which is arranged about a pin 72 which is pivotably connected to the rib 69. The pin protrudes through a hole in a bracket 73 rigidly attached to link part 14. Thus, rib 69 is urged into engagement with projection 63 and counteracts movements of the limbing member 54 in a direction away from the center of the tree movement path through the apparatus. The ribs 68, 69 extend across the direction of movement of the limbing member 54 in the guide 59. During pivotal movement of the grabbing arms 1, 2 link parts 13, 14 will move relative to each other and thereby projection 63 will assume different positions in the guide 67. However, the limbing member 54 will not essentially move in the guide 59 until the force of spring 71 is overcome through the engagement of the limbing member 54 with the tree trunk in the apparatus.

It will be noted that in case the limbing members 44 will not pivot away completely when grabbing a tree trunk, the inner sides 74 of the limbing members will move the tree trunk into engagement with the rolls in a corresponding manner. The inner sides 74 of the limbing members 44 are designed in a corresponding manner to the inner sides 61 of the grabbing arms. Thus, the inner sides 74 of the limbing members may in this case be regarded as the inner sides of the grabbing arm parts 3, 5.

In FIG. 5, the apparatus is partially and diagrammatically illustrated with a tree trunk located therein. The rolls 37 have, counteracted by the springs 40, assumed the most advantageous position for the feeding action so that the tree trunk has its periphery abutting against the deepest portion of the rolls while the rolls are essentially parallel. The tree trunk is efficiently held between the rolls 37 and limbing members 44, 54, which closely surround the tree trunk. The rolls may pivot to and fro in any necessary degree about shafts 39.

From FIG. 5, it appears that the frames 38 have shoulders 75 arranged to preclude a collision between the rolls 37. The shoulders 75 project outwardly of the peripheries of the rolls and will abut against each other in case the rolls are moved too near each other. In the embodiment, the shoulders are only arranged at the bottom of the frames since the chains 43 prevent the upper portions of the rolls from hitting each other. However, shoulders 75 may of course also be arranged at the upper portions of the frames.

The limbing members 44, 54 may have cutting edges on two opposite sides facing in the tree movement path through the apparatus. Thus, the limbing members may carry out limbing during movement of the tree trunk through the apparatus in either direction. In FIG. 3, the severing device 76 at the exit end of the apparatus is shown. The severing device comprises a chain saw having a pivotable sword 77 and a saw chain 78 thereon.

The apparatus is arranged to be carried by a crane arm 27 which is partially illustrated in FIG. 1. The crane arm 27 may be included in a crane having two arms pivotable in relation to each other by means of e.g. a piston-cylinder mechanism. The crane arm 27 may constitute one of said two arms and the other of said two arms may be connected to a vehicle. The entire crane should be rotatable on the vehicle about a vertical axis. The crane arm 27 is provided with two lugs 28 rotatably connected to a flange 29 by means of a pin 31. The flange 29 is connected to a combined rotational connection and drive means 30 which may be of the type comprising a stator 30' and a rotor 30''. The rotor may be rotated by pressure fluid relative to the stator about a vertical axis. The stator is connected to the flange 29 while the rotor has two lugs 32 connected to a flange 33 by means of a pin 35. The flange 33 is connected to a second combined rotational connection and drive means 34 which also is of the pressure fluid driven type comprising a rotor 34' and a stator 34''. The stator 34'' is rigidly connected to flange 33 while the rotor 34' is rigidly connected to the lugs 16 by bolts 36. Means 34 is operable about an essentially horizontal axis and thus, the apparatus may be pivoted by means 34 between a position in which grabbing arms 1, 2 are directed downwardly and a position in which the grabbing arms are directed essentially horizontally. The horizontal axis of rotation of means 34 is directed perpendicularly to pin 35 which in turn is directed perpendicularly to pin 31. By means 30 and 34, the apparatus may be rotated about a vertical axis as well as pivoted about a horizontal axis in order to adjust the apparatus into the most suitable position. The flange 33 and the lugs 32 may be rigidly connected by e.g. bolts instead of the pin 35.

The apparatus according to the invention may preferably be connected to a crane on an ordinary tractor vehicle which preferably may have a trailer for carrying logs.

The apparatus according to the invention may be used as follows: When the apparatus is to be used for standing trees, the vehicle carrying the apparatus is driven towards the tree, whereafter the apparatus by means of the combined rotational connection and drive means 34 is pivoted upwardly so that the grabbing arms 1, 2 are directed essentially horizontally. The limbing members 44, 54 should then be located upwardly while the severing device 76 should be located downwardly. The grabbing arms are pivoted away from each other by piston-cylinder mechanism 17 and the apparatus is moved forwardly by means of the crane arm 27 so that the grabbing arms surround the tree trunk. Then, grabbing arms 1, 2 are moved towards each other so that the rolls 37 engage the tree, a suitable contact pressure may be adjusted in a manner known per se. The apparatus may then be moved upwardly along the tree trunk by the rolls 37 in order to limb the lower part of the tree if necessary. Then, the direction of rotation of rolls 37 is reversed so that the apparatus is moved along the tree trunk into a position near the root thereof in which position the tree may be severed by severing device 76. The tree is then turned into an essentially horizontal position together with the grabbing arms 1, 2. The rolls 37 are then rotated to feed the tree through the apparatus and at the same time the tree is limbed by limbing members 44, 54. When a suitable length has been fed through and limbed, the tree is severed by the severing device. A particular advantage of the invention is that logs may easily be moved and assorted by the apparatus since it performs efficiently as a conventional grab loader device and is capable of grabbing several logs simultaneously. Another important advantage of the invention is that the apparatus may be used for limbing and severing trees already felled and lying on the ground. The apparatus may easily grab the root end of the tree and move it into engagement with the rolls by pivoting the grabbing arms towards each other. During limbing and severing, the tree is normally maintained in an at least partially elevated condition by means of the apparatus and the crane arm. If the rolls are not capable alone to draw a big tree having thick branches through the apparatus, the operator may move the crane arm 27 towards the top of the tree, which top lies on the ground, and then the apparatus will move relative to the tree. After having processed a number of trees, it is possible to move the logs by the apparatus and the logs may be loaded onto the trailer of the vehicle carrying the apparatus. The apparatus may easily be loosened from the crane arm, and then, a conventional grab loading device may be connected to the crane arm so that the vehicle may be used for other purposes than carrying the limbing and severing apparatus according to the invention.

The invention is not limited to the embodiment illustrated. The number and location of the rolls may be varied. E.g. it is possible to locate the rolls sidewardly of the grabbing arms. Four rolls may be used; two at the entrance end and two at the exit end of the apparatus. Also other modifications are possible.

What I claim is:

1. An apparatus for processing trees comprising a grabbing device including at least two grabbing arms being movable towards and away from each other in order to grab a tree, at least one limbing member to limb the tree, and at least two rolls to feed the tree through the apparatus, said rolls being arranged on said grabbing arms in order to follow the grabbing arms in their movements towards and away from a tree movement path through the apparatus, said apparatus being connected to a crane arm through a first rotational connection allowing a pivotal movement of the apparatus relative to the crane arm in an essentially vertical plane, the apparatus being connected to the crane arm through a second rotational connection having an essentially vertical axis about which the apparatus is rotatable in a suspended state by means of a drive means with said grabbing arms depending downwardly from said second rotational connection, said rolls being pivotable relative to the grabbing arms about shafts extending essentially perpendicularly to the axes of rotation of said rolls and essentially normal to the plane of movement of the grabbing arms.

2. The apparatus according to claim 1, wherein said rolls have a concave envelope surface, the portions of said envelope surfaces having the smallest diameter being located near the pivot shafts.

3. The apparatus according to claim 1, wherein the rolls are rotatably supported in frames being pivotable about said shafts.

4. The apparatus according to claim 3, wherein said frames are actuated by one or more springs urging the ends of said frames adjacent the free ends of the grabbing arms away from each other.

5. The apparatus according to claim 3, wherein said frames have co-operating shoulder means for precluding a collision between said rolls.

6. An apparatus for processing trees comprising a grabbing device including at least two grabbing arms being movable towards and away from each other in order to grab a tree, at least one limbing member to limb the tree, and at least two rolls to feed the tree through the apparatus, said rolls being arranged on said grabbing arms in order to follow the grabbing arms in their movements towards and away from a tree movement path through the apparatus, said apparatus being connected to a crane arm through a first rotational connection allowing pivotal movement of the apparatus relative to the crane arm in an essentially vertical plane, the apparatus being connected to the crane arm through a second rotational connection having an essentially vertical axis about which the apparatus is rotatable in a suspended state by means of a drive means with said grabbing arms depending downwardly from said second rotational connection, a second limbing member being connected to a part interconnecting the grabbing arms, said second limbing member being movable in an essentially straight path, and a spring for counter-acting movements of the second limbing member away from the center of the tree movement path through the apparatus.

7. The apparatus according to claim 6, wherein the grabbing arms are pivotably interconnected through at least two link parts, a straight line between the pivot connections of one of said link parts with the grabbing arms crossing a straight line between the pivot connections of the other link part, said first link part forming a base adapted to be connected to the crane arm, said guide being arranged on said first link part.

8. The apparatus according to claim 7, wherein said second limbing member comprises a portion engaging a second guide on said second link part, said second guide being formed by a rib rigidly connected to the second link part and a second resilient rib, said ribs extending across the direction of movement of said second limbing member in said first guide.

9. The apparatus according to claim 8, wherein said second rib is pivotably supported on said second link part.

10. An apparatus for processing trees comprising at least two arms, means mounting said arms for movement toward and away from each other, and at least one limbing member to limb the tree, each of said arms carrying at least one roll, said rolls being adapted to feed the tree trunk through the apparatus, and said rolls being pivotable relative to the arms about shafts extending essentially perpendicularly to the axes of rotation of said rolls and essentially normal to the plane of movement of the arms.

11. Apparatus according to claim 10, wherein the rolls are rotatably supported in frames being pivotable about said shafts.

12. Apparatus according to claim 11, wherein said frames are actuated by one or more springs urging the ends of said frames adjacent the free ends of the arms away from each other.

13. Apparatus according to claim 10, wherein said rolls have a concave envelope surface, the portions of said envelope surfaces having the smallest diameter being located near the pivot shafts.

14. Apparatus according to claim 11, wherein said frames have co-operating shoulder means arranged in an opposed relation for precluding a collision between said rolls by abutment of said shoulder means against each other.

15. An apparatus for processing trees comprising at least two arms, means mounting said arms for movement toward and away from each other, and at least one limbing member to limb the tree, each of said arms carrying at least one roll, said rolls being adapted to feed the tree trunk through the apparatus, said limbing member being connected to a part interconnecting the arms, and said limbing member being movable along a guide in an essentially straight path and associated to at least one spring counteracting movements of the limbing member away from the center of the tree movement path through the apparatus.

16. Apparatus according to claim 15, wherein the arms are pivotably interconnected through at least two link parts, a straight line between the pivot connections of one of said link parts with the arms crossing a straight line between the pivot connections of the other link part, said first link part forming a base adapted to be connected to a crane arm, and said guide being arranged on said first link part.

17. Apparatus according to claim 16, wherein said limbing member comprises a portion engaging a second guide on said second link part, said second guide being formed by a rib rigidly connected to the second link part and a second resilient rib, and said ribs extending across the direction of movement of said limbing member in said first guide.

18. Apparatus according to claim 17, wherein said second rib is pivotably supported on said second link part.

19. Apparatus according to claim 15, wherein at least two second limbing members are pivotably journalled directly on the arms and said second limbing members have rigid slide members spaced apart from their pivot axes to support the limbing member by sliding abutment against the grabbing arms.

* * * * *